(12) United States Patent
Lwasa et al.

(10) Patent No.: US 7,765,784 B2
(45) Date of Patent: Aug. 3, 2010

(54) THERMALLY COMPLIANT APU EXHAUST DUCT ARRANGEMENTS AND ASSOCIATED SYSTEMS AND METHODS

(75) Inventors: Ronald M. Lwasa, Everett, WA (US); Allen D. Chow, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 915 days.

(21) Appl. No.: 11/527,213

(22) Filed: Sep. 25, 2006

(65) Prior Publication Data
US 2008/0078863 A1      Apr. 3, 2008

(51) Int. Cl.
*F01B 31/06*     (2006.01)
(52) U.S. Cl. .............................. 60/39.5; 60/687; 60/772
(58) Field of Classification Search .................. 60/39.5, 60/687, 772, 796, 799, 779, 39.091, 39.094; 138/113, 114; 181/213; 220/745–750
See application file for complete search history.

(56) References Cited

U.S. PATENT DOCUMENTS

| | | | |
|---|---|---|---|
| 2,016,253 A | 10/1935 | Noblitt et al. | |
| 2,512,155 A | 6/1950 | Hill | |
| 2,988,302 A | 6/1961 | Smith | |
| 3,033,307 A | 5/1962 | Sanders et al. | |
| 3,353,626 A | 11/1967 | Cremer et al. | |
| 3,437,173 A | 4/1969 | Ehrich | |
| 3,439,774 A | 4/1969 | Callaway et al. | |
| 3,519,843 A | 7/1970 | Trautman | |
| 3,648,803 A | 3/1972 | Heath et al. | |
| 3,680,660 A | 8/1972 | Dubois | |
| 3,764,815 A | 10/1973 | Habock et al. | |
| 3,913,702 A | 10/1975 | Wirt et al. | |
| 3,920,095 A | 11/1975 | Clark | |
| 4,001,892 A | 1/1977 | Castelli et al. | |
| 4,064,961 A | 12/1977 | Tseo | |
| 4,091,892 A | 5/1978 | Hehmann et al. | |
| 4,137,992 A | 2/1979 | Herman | |
| 4,226,297 A | 10/1980 | Cicon | |

(Continued)

FOREIGN PATENT DOCUMENTS

CA      2261730      2/1998

(Continued)

OTHER PUBLICATIONS

Aries Limited, "Model "A" Ford Tapered Muffler," mhtml:file;//C:/TEMP/Model%20A%20Ford%20Tapered%20Muffler.mht, 1 page [Accessed May 28, 2004].

(Continued)

*Primary Examiner*—Michael Cuff
*Assistant Examiner*—Vikansha S Dwivedi
(74) *Attorney, Agent, or Firm*—Perkins Coie LLP

(57) ABSTRACT

Thermally compliant auxiliary power unit (APU) ducts arrangements, and associated systems and methods are disclosed. A system in accordance with one embodiment includes an auxiliary power unit exhaust, that in turn includes an exhaust flow conduit, a housing disposed outwardly from the conduit, a support providing a load path between the conduit and the housing, and a baffle positioned along the flow conduit. At least one of the support and the baffle can have a resilient, radially compressible portion between the flow conduit and the housing.

23 Claims, 5 Drawing Sheets

U.S. PATENT DOCUMENTS

| | | | |
|---|---|---|---|
| 4,244,441 A | 1/1981 | Tolman |
| 4,314,621 A | 2/1982 | Hansen |
| 4,359,136 A | 11/1982 | Eriksson |
| 4,360,075 A | 11/1982 | Blaser et al. |
| 4,371,053 A | 2/1983 | Jones |
| 4,456,830 A | 6/1984 | Cronin |
| 4,645,032 A | 2/1987 | Ross et al. |
| 4,744,440 A | 5/1988 | Hanson |
| 4,979,587 A | 12/1990 | Hirt et al. |
| 5,162,620 A | 11/1992 | Ross et al. |
| 5,268,541 A | 12/1993 | Pettersson |
| 5,365,025 A | 11/1994 | Kraai et al. |
| 5,655,359 A | 8/1997 | Campbell |
| 5,902,970 A | 5/1999 | Ferri |
| 6,018,233 A | 1/2000 | Glennon |
| 6,039,287 A | 3/2000 | Liston et al. |
| 6,092,360 A | 7/2000 | Hoag et al. |
| 6,158,546 A | 12/2000 | Hanson et al. |
| 6,244,539 B1 | 6/2001 | Liston et al. |
| 6,272,838 B1 | 8/2001 | Harvell et al. |
| 6,308,915 B1 | 10/2001 | Liston et al. |
| 6,360,844 B2 | 3/2002 | Hogeboom et al. |
| 6,508,219 B2 | 1/2003 | Schorn |
| 6,615,576 B2 | 9/2003 | Sheoran et al. |
| 6,651,929 B2 | 11/2003 | Dionne |
| 6,695,094 B2 | 2/2004 | Moffat et al. |
| 7,210,652 B2 | 5/2007 | Hein et al |
| 2002/0139120 A1 | 10/2002 | Sheoran et al. |
| 2006/0043236 A1 | 3/2006 | Campbell |
| 2006/0071123 A1 | 4/2006 | Nguyen |
| 2006/0102779 A1 | 5/2006 | Campbell |
| 2006/0168968 A1 | 8/2006 | Zielinski |
| 2006/0180388 A1 | 8/2006 | Brown et al. |
| 2006/0207826 A1* | 9/2006 | Williams .................. 181/214 |
| 2006/0207827 A1* | 9/2006 | Williams et al. ............ 181/227 |
| 2007/0063098 A1 | 3/2007 | Dionne |
| 2008/0179466 A1 | 7/2008 | Campbell et al. |

FOREIGN PATENT DOCUMENTS

| | | |
|---|---|---|
| DE | 69712210 | 10/2002 |
| DE | 69712797 | 11/2002 |
| EP | 0923488 | 6/1999 |
| EP | 1010618 | 6/2000 |
| EP | 1686058 | 8/2006 |
| JP | 57-113919 | 7/1982 |
| JP | 05-163925 | 6/1993 |
| JP | 200516553 | 12/2000 |
| WO | WO-98/05553 | 2/1998 |

OTHER PUBLICATIONS

Henri Coanda, mhtml:file://C:\Temp\Henri%20Coanda.mht, 2 pgs [Accessed May 28, 2004].

Michael Andretti Powersports, "Titanium Oval Muffler," mhtml:file://C:\TEMP\OVAL%20MUFFLER%20-%20step%20increases.mht, 1 pg; [May 28, 2004].

International Search Report for Application No. PCT/US/2007/016093; Applicant: The Boeing Company; Filed: Jul. 16, 2007; Mailed on Aug. 22, 2007 (13 pages).

* cited by examiner

THERMALLY COMPLIANT APU EXHAUST DUCT ARRANGEMENTS AND ASSOCIATED SYSTEMS AND METHODS

TECHNICAL FIELD

The present disclosure is directed generally to thermally compliant APU exhaust duct arrangements, and associated systems and methods.

BACKGROUND

Existing commercial transport jet aircraft typically include two or more primary turbine engines for propulsion. These aircraft also typically include at least one auxiliary power unit (APU) that provides power in addition to or in lieu of the power provided by the primary engines. Accordingly, APUs can be used to provide power to the aircraft when the primary engines are not running, for example, while the aircraft is waiting at an airport gate. The APUs can also provide temporary power to start the primary engines during normal operations, and/or temporary emergency power during an engine-out condition or other emergency condition.

Over the course of time, aircraft manufacturers and airlines have come under increasing pressure to reduce the noise emitted by aircraft during normal operations, including gate operations, taxi, take-off, and landing. Accordingly, aircraft manufacturers have developed mufflers and other sound-attenuating devices to reduce the noise emitted by both the aircraft primary engines and the APUs. One challenge associated with APU mufflers is developing internal structures that are both lightweight and capable of withstanding the large temperature gradients between the hot APU exhaust flow within the muffler, and the cold external environment associated with typical aircraft cruise altitudes. Accordingly, there is a need for APU exhaust duct structural arrangements that are both lightweight (to improve overall aircraft efficiency) and capable of withstanding large thermal gradients without buckling or otherwise becoming damaged.

SUMMARY

The following summary is provided for the benefit of the reader only, and is not intended to limit in any way the invention as set forth by the claims. The present disclosure is directed generally toward thermally compliant APU exhaust duct arrangements, and associated systems and methods. A system in accordance with a particular embodiment includes an auxiliary power unit exhaust, which in turn includes an exhaust flow conduit, a housing disposed outwardly from the flow conduit, and a support providing a load path between the flow conduit and the housing. The system can further include a baffle positioned along the flow conduit. The support and/or the baffle can have a resilient, radially compressible portion between the flow conduit and the housing. Accordingly, in particular embodiments, the radially compressible portion can absorb radial stresses without causing the structure (e.g., the support or the baffle) in which it is installed to buckle.

In a particular embodiment, the compressible portion can have a cross-sectional profile shape that varies in a non-monotonic manner. The profile can be formed by pre-buckling the support and/or the baffle before mounting it between the flow conduit and the housing. In a further particular embodiment, the support includes a bulkhead, and both the bulkhead and the baffle are positioned in an annular region between the exhaust flow conduit and the housing. The bulkhead and the baffle can each have a generally uniform material thickness, with generally uniform material properties. The bulkhead and the baffle can each include a radially compressible portion with a wavy profile shape having a peak and a trough projecting in opposing directions generally parallel to a flow path of the exhaust conduit. Accordingly, the peak and trough can form circumferentially-extending ridges around the exhaust flow conduit.

Certain aspects are also directed to methods for making and/or using exhaust duct arrangements. For example, one such method can include providing a support and a baffle, forming a resilient, radially compressible portion in at least one of the support and the baffle, and connecting the support and the baffle between an outer housing and an exhaust flow conduit for an auxiliary power unit. In another embodiment, a method for operating an aircraft auxiliary power unit can include directing exhaust products from an aircraft auxiliary power unit into an exhaust flow duct that is carried by a support and has an outwardly positioned baffle. The method can further include heating the exhaust flow duct with the exhaust products and, (in the baffle, the support or both), causing flexion in a direction toward and away from the flow duct as the flow duct changes temperature, without buckling.

DETAILED DESCRIPTION

Aspects of the present disclosure are directed generally to thermally compliant auxiliary power unit exhausts and associated systems and methods. Several embodiments of such systems and methods are described below. A person skilled in the relevant art will understand, however, that the invention may have additional embodiments, and that the invention may be practiced without several of the details of the embodiments described below with reference to FIGS. 1-5B.

Figure 1:
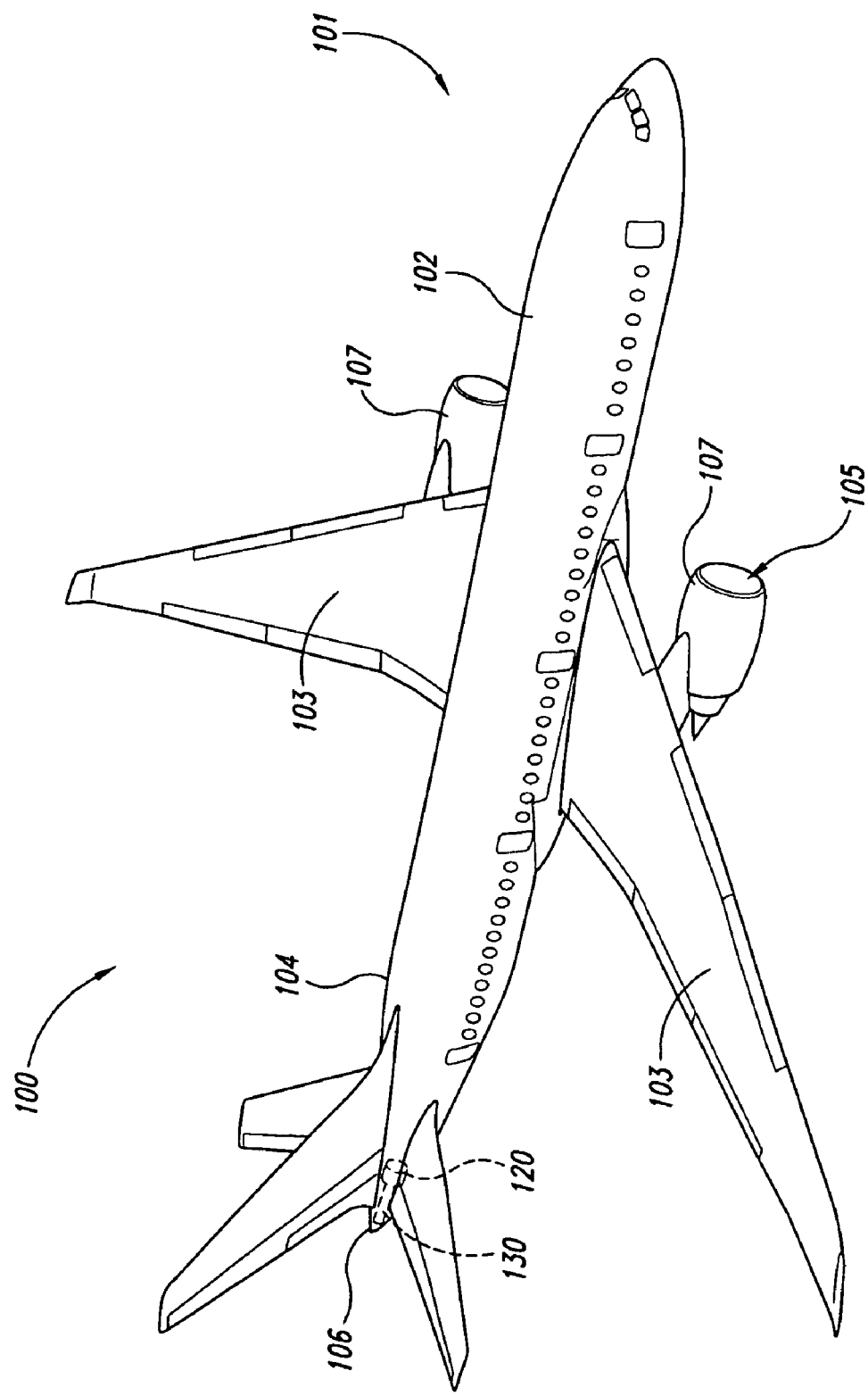
FIG. 1 is an isometric illustration of an aircraft system that includes an aircraft carrying an auxiliary power unit (APU) having an exhaust arrangement configured in accordance with an embodiment of the invention.

FIG. 1 is a partially schematic illustration of an aircraft system 100 that includes an aircraft 101 having an auxiliary power unit (APU) 120 and an associated exhaust system 130 configured in accordance with an embodiment of the invention. The APU 120 and the exhaust system 130 can be housed in a tail cone 106 of the aircraft 101. The aircraft 101 can also include a fuselage 102, an empennage 104, and wings 103 carried by the fuselage 102. A propulsion system 105 provides primary power for the aircraft 101, and can in turn include primary engines 107 (e.g., turbofan engines). The APU 120 can provide power in addition to and/or in lieu of the power provided by the primary engines 107 during particular phases of the aircraft operation, including ground operations and selected in-flight conditions. Further details of the exhaust system 130 for the APU 120 are described below with reference to FIGS. 2-5B.

Figure 2:
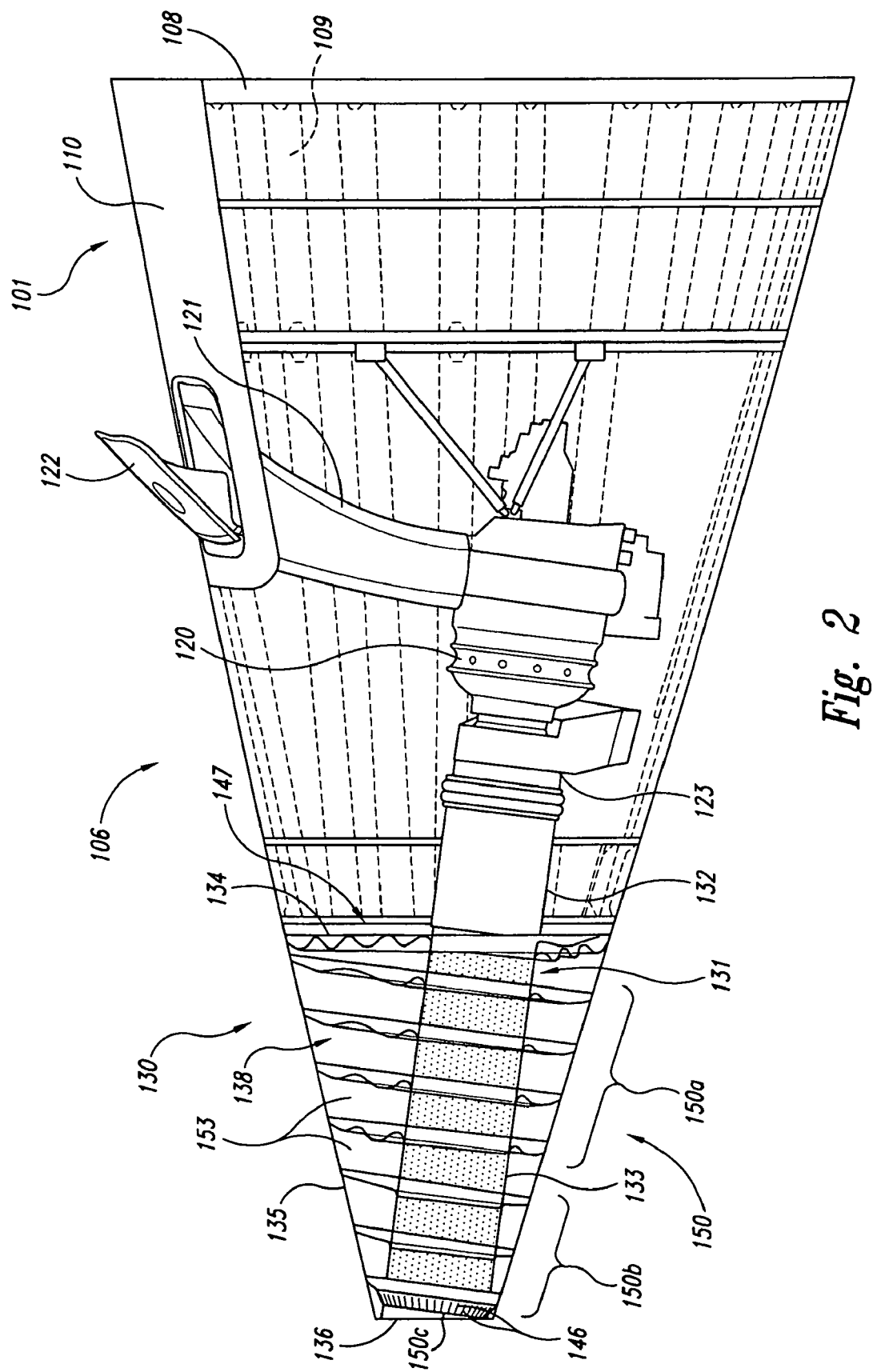
FIG. 2 is a partially cut-away, partially schematic, side elevation view of an aircraft tail cone housing an APU and associated exhaust conduit in accordance with an embodiment of the invention.

FIG. 2 is an enlarged, partially cut-away, partially schematic side view of an embodiment of the tail cone 106 (shown in FIG. 1), along with the APU 120 and the exhaust system 130. The tail cone 106 can include a plurality of bulkheads 108 and ribs or stringers 109, covered by an external skin 110. The tail cone 106 (or a portion of the tail cone 106) can accordingly provide a compartment that houses the APU 120. For purposes of illustration, certain details and selected subsystems of the APU 120 are not shown in FIG. 2.

The APU 120 can include a turbine (e.g., an axial or radial flow turbine) that receives external air from an APU inlet duct 121. A deployable APU inlet door 122 opens the APU inlet duct 121 during APU operation, and closes the APU inlet duct 121 when the APU is not running. The APU 120 also includes an exhaust aperture 123 through which combustion products exit. The exhaust aperture 123 is coupled to the exhaust system 130, which directs the exhaust products overboard the aircraft 101.

The illustrated exhaust system 130 includes an exhaust conduit 131 connected to the exhaust aperture 123. The exhaust conduit 131 has an exit aperture 136 positioned at the aft end of the tail cone 106, for directing the hot exhaust products aftward. The exhaust conduit 131 can include a forward, unperforated segment 132 connected to the exhaust aperture 123, and an aft segment 133 that includes the exit aperture 136. In a particular embodiment, the aft segment 133 is perforated to attenuate the noise generated by the high velocity, high-temperature combustion products emitted by the APU 120. Accordingly, the aft segment 133 can form a portion of a muffler 138 that also includes baffles 150 positioned to separate or at least partially separate adjacent acoustic chambers 153 from each other. An outer housing 135 (which can be contiguous with the aircraft external skin 110, or can be a portion of the external skin 110) forms an outer boundary of the acoustic chambers 153. Noise energy can accordingly propagate through the perforations in the aft segment 133, and is dissipated in the acoustic chambers 153.

A support structure 147 can carry the exhaust conduit 131 and support it relative to the outer housing 135. In a particular embodiment, the support structure 147 includes an exhaust bulkhead 134 that isolates the muffler 138 (in which hot exhaust products are present) from the forward portion of the tail cone 106 (from which hot exhaust products are generally excluded). The support structure 147 (e.g., the exhaust bulkhead 134 or another structure) and/or the baffles 150 can include a radially compliant, resilient region that accommodates radial stresses caused by the thermal gradient between the relatively hot exhaust conduit 131 and the relatively cool housing 135. In a particular embodiment shown in FIG. 2, both the exhaust bulkhead 134 and several of the baffles 150 include shaped contours or other radially compliant, resilient features. For example, the baffles 150 can include forward baffles 150a that include such features, and aft baffles 150b that do not. It is expected that the exhaust bulkhead 134 and the forward baffles 150a can accordingly accommodate the more extreme thermal gradients likely to exist at the forward portion of the tail cone 106. In other embodiments, more or fewer of the baffles 150 may include radially compliant features, depending upon factors such as the expected thermal gradients, and the physical characteristics of the muffler 138. Further details of these features, as applied to the baffles 150 and the exhaust bulkhead 134, are described later with reference to FIG. 3.

In a particular embodiment, an aft-most baffle 150c is configured to support the exhaust conduit 131, as well as to provide a boundary for the aft-most one of the acoustic chambers 153. For example, the aft-most baffle 150 can include multiple, circumferentially-spaced fingers 146, the ends of which contact the exhaust conduit 131. The fingers 146 can bear against the exhaust conduit 131, but need not be rigidly attached to the exhaust conduit 131. Accordingly, the fingers 146 can slide axially relative to the exhaust conduit 131 when the exhaust system 130 is subjected to thermal loads, while still providing radial support for the exhaust conduit 131.

Figure 3:
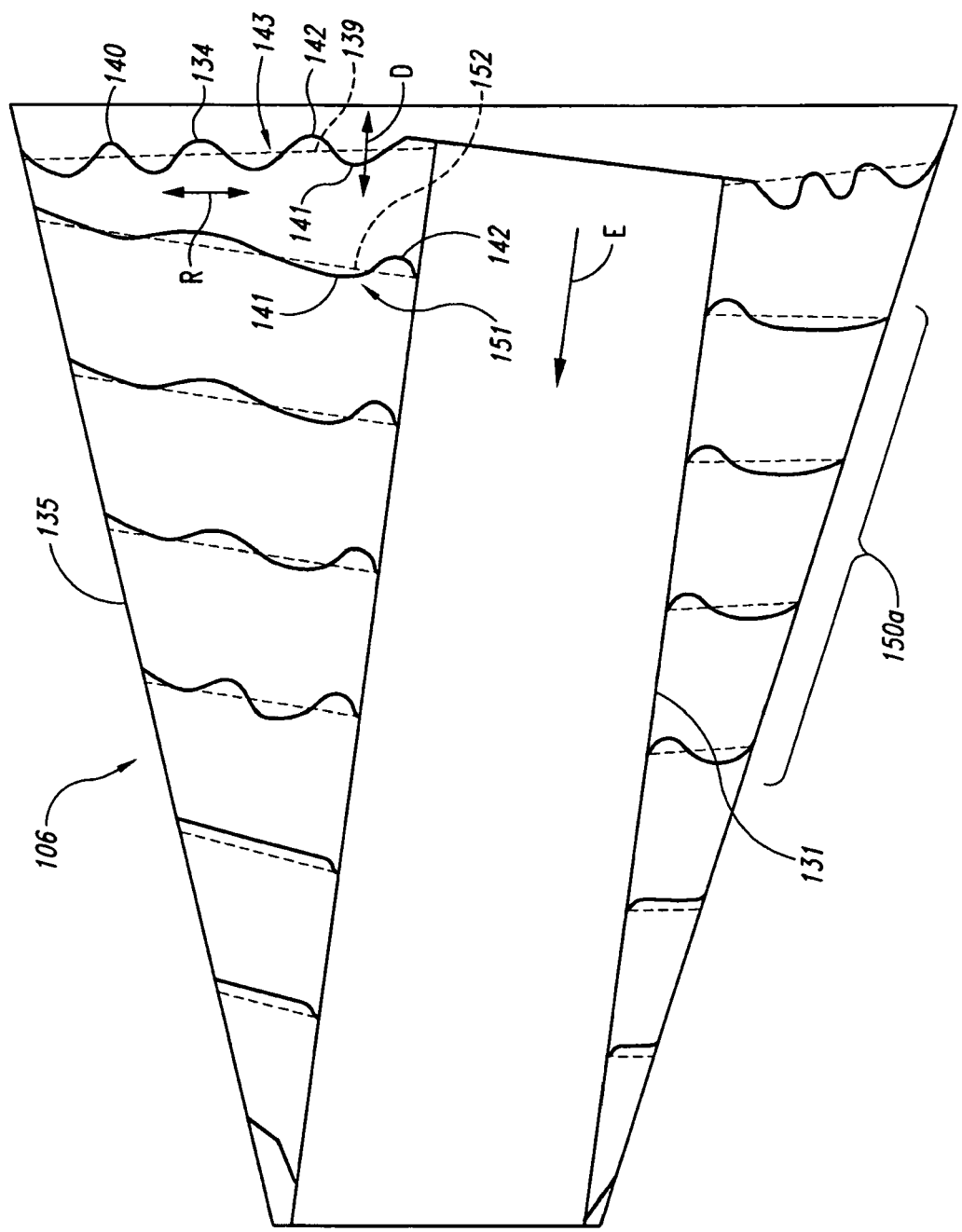
FIG. 3 is a simplified, partially schematic, side cross-sectional view of a portion of the tail cone shown in FIG. 2.

FIG. 3 is a partially schematic, cross-sectional illustration of the aft portion of the tail cone 106 shown in FIG. 2, configured in accordance with an embodiment of the invention. As shown in FIG. 3, the exhaust bulkhead 134 includes a radially compressible portion 143 (e.g., a flexion or flexure portion) located between the outer housing 135 and the inwardly positioned exhaust conduit 131. In a particular aspect of this embodiment, the radially compressible portion 143 includes a contoured section of the exhaust bulkhead 134, which is illustrated by the contoured shape of the bulkhead cross-sectional profile 140. The contoured or "wavy" profile 140 can flex radially inwardly and outwardly (indicated by arrow R) as the bulkhead 134 is subjected to thermal loading. For example, the cross sectional profile 140 can include peaks 141 and troughs 142 that together form a roughly sinusoidally varying shape. In other embodiments, the profile 140 can have other shapes that also provide flexible resilience in the radial direction R. In at least some of these embodiments, the cross-sectional profile 140 can extend both forward and aft (as indicated by arrow D) relative to a bulkhead axis 139 that extends outwardly away from the exhaust conduit 131. Accordingly, the shape of the profile 140 varies in a non-monotonic manner along the bulkhead axis 139. As the exhaust conduit 131 and the exhaust bulkhead 134 heat and expand, neighboring peaks 141 and troughs 142 can compress toward each other due to the constraint provided by the outer housing 135. As the exhaust conduit 131 and the exhaust bulkhead 134 cool, the exhaust bulkhead 134 can return to its original shape.

The radially compressible portion 143 of exhaust bulkhead 134 can have a radial extent sized to produce the desired level of flexibility and stability. For example, in the embodiment illustrated in FIG. 3, the compressible portion 143 can extend over most or all of the radial extent of the exhaust bulkhead 134. In other embodiments, including those described later with reference to FIGS. 5A-5B, the compressible portion 143 can occupy less of the radial extent of the exhaust bulkhead 134.

The forward baffles 150a can include radially compressible portions 151 that perform a function generally similar to that performed by the radially compressible portion 143 of the exhaust bulkhead 134. Accordingly, individual forward baffles 150a can include peaks 141 and troughs 142 that extend aft and forward relative to a corresponding baffle axis 152. In a particular aspect of this embodiment, the inner extremity of each baffle 150 is offset from the exhaust conduit 131 by a small distance (e.g., about 0.01 inches to about 0.02 inches). In other embodiments, the baffles 150 can be connected to or at least bear against the exhaust conduit 131. In either embodiment (even without direct contact between the baffles 150 and the exhaust conduit 131), the baffles 150 are subjected to thermal stresses, due to the high temperature of the gas in the exhaust conduit 131 and the constraint provided by the housing 135. The radially compressible portions 151 can accommodate these stresses by expanding and contracting as the exhaust conduit 131 heats and cools.

Figure 4:
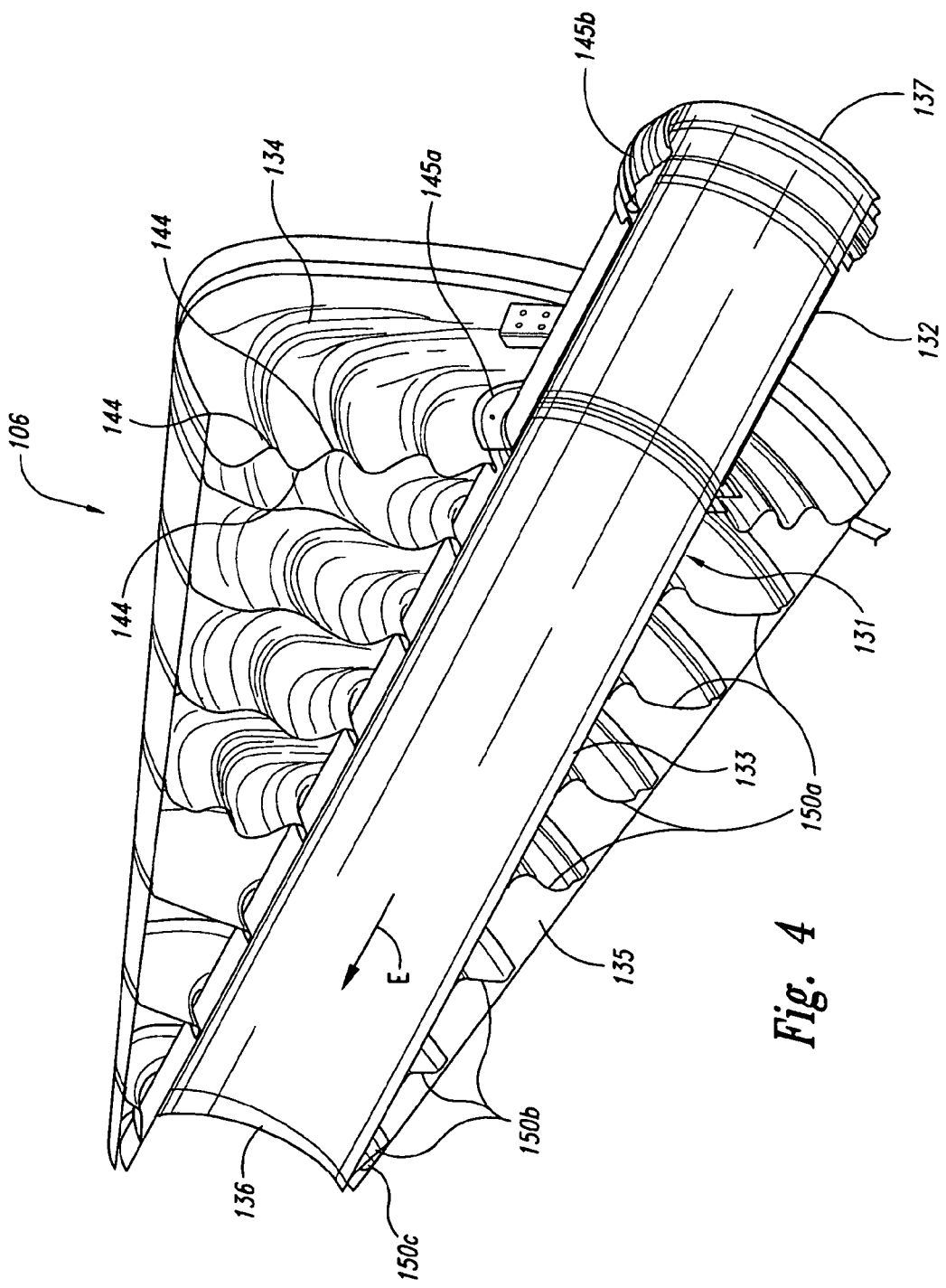
FIG. 4 is a partially schematic, cut-away side view of the portion of the tail cone shown in FIG. 3.

FIG. 4 is a partially schematic, isometric cutaway illustration of the tail cone 106, illustrating the contours in the exhaust bulkhead 134 and the forward baffles 150a. The contours can take the form of ridges 144 that extend in a circumferential direction around the exhaust conduit 131. Each ridge 144 can correspond to one of the peaks 141 or troughs 142 shown in FIG. 3.

In particular embodiments, the exhaust conduit 131 includes a material, such as Inconel 625, capable of withstanding high operating temperatures. The operating temperatures can range from about 750° F. to about 1,000° F., depending upon the particular location within the exhaust conduit 131, and can have other values in other embodiments. The exhaust bulkhead 134 and the forward baffles 150a can also be formed from a material selected to be compatible with the expected thermal loads and temperature gradients. For example, in one embodiment, these elements can be formed from titanium or a titanium alloy, having a generally uniform thickness (e.g., 0.040 inches). In other embodiments, the dimensions of these structures and/or the materials forming the structures can be different.

The exhaust bulkhead 134 and the forward baffles 150a can be formed using a variety of techniques that facilitate the operation of the corresponding resilient, radially compressible region. For example, in a particular manufacturing technique, the exhaust bulkhead 134 and the forward baffles 150a can be "pre-buckled" to form a wavy or other contoured shape that allows these structures to deform in a plastic manner under thermal stresses. In one application of this technique, the exhaust bulkhead 134 and/or the forward baffles 150a can initially be in a flat sheet form, which is pressed between corresponding male and female dies (e.g., in combination with heating) to create the contours at the corresponding radially compressible portions. In other embodiments, other techniques can be used to form these contours. For example, the structures can be cast into the end shape, rather than being formed between dies.

During assembly and installation, the exhaust conduit 131 is installed so as to be supported relative to the outer housing 135 by the exhaust bulkhead 134 and the aft-most baffle 150c. The forward and aft segments 132, 133 are joined with a first coupling 145a, and the forward segment 132 is joined to the APU 120 (FIG. 2) with a second coupling 145b so that the APU exhaust aperture 123 (FIG. 2) is aligned with a conduit entrance 137.

In operation, exhaust gas is directed through the exhaust conduit 131 as indicated by arrow E, heating the exhaust bulkhead 134 and the baffles 150 as it does so. The exhaust bulkhead 134 and the forward baffles 150a tend to experience a greater thermal gradient than do the aft bulkheads 150b, which tend to be heated more uniformly as a result of the passage of the exhaust products through the exhaust conduit 131. As the exhaust bulkhead 134 and the forward baffles 150a heat up, they can flex in a radial direction under the thermal stresses described above, but tend not to buckle or otherwise deform in a non-plastic manner. Accordingly, when the exhaust conduit 131 cools, the exhaust bulkhead 134 and the forward baffles 150a can return to their original shapes.

One advantage associated with at least some of the foregoing features is that the structures having the radially compressible portions (e.g., the exhaust bulkhead 134 and/or the baffles 150) can flex radially under thermal loads, without buckling. Accordingly, these elements can retain structural integrity, despite repeated thermal cycling. Another advantage associated with at least some of the foregoing features is that the flexible structures are expected to have an increased resistance to sonic fatigue.

Still another advantage associated with at least some of the foregoing arrangements is that they can include structures (e.g., the exhaust bulkhead 154 and/or the baffles 150) that are radially flexible, but are formed from a generally uniformly thick material, e.g., a generally uniform sheet. This arrangement can produce a resilient, yet flexible structure at relatively low cost and weight. For example, in at least some cases, the exhaust bulkhead 134 and/or the baffles 150 can be formed without additional components, e.g., without stiffeners or other elements that increase the strength of the exhaust bulkhead 134 and/or the forward baffles 150a, but also add weight and cost.

Figure 5A:
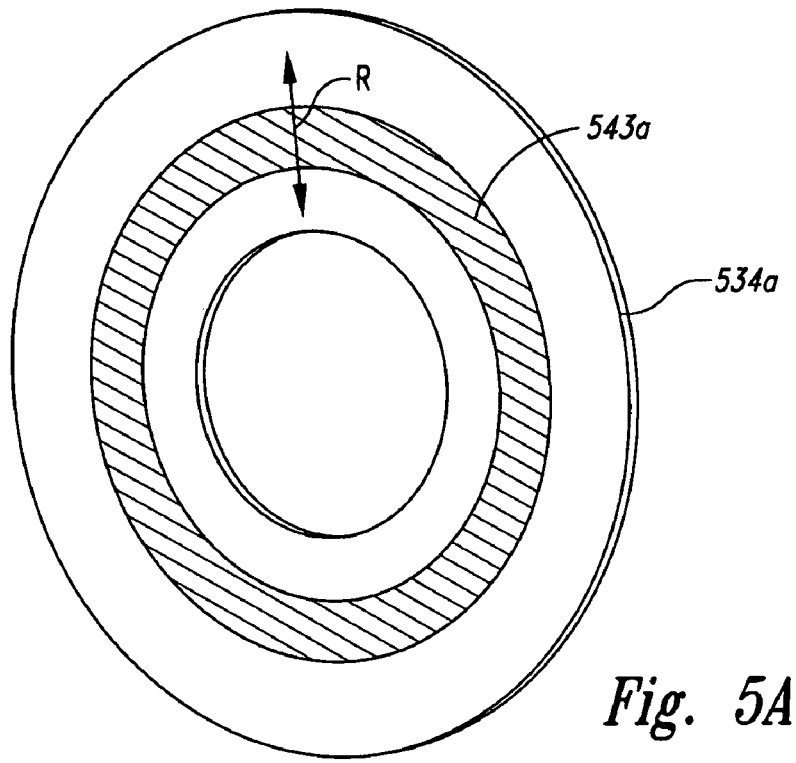
FIGS. 5A and 5B illustrate exhaust bulkheads configured in accordance with further embodiments of the invention.
Figure 5B:
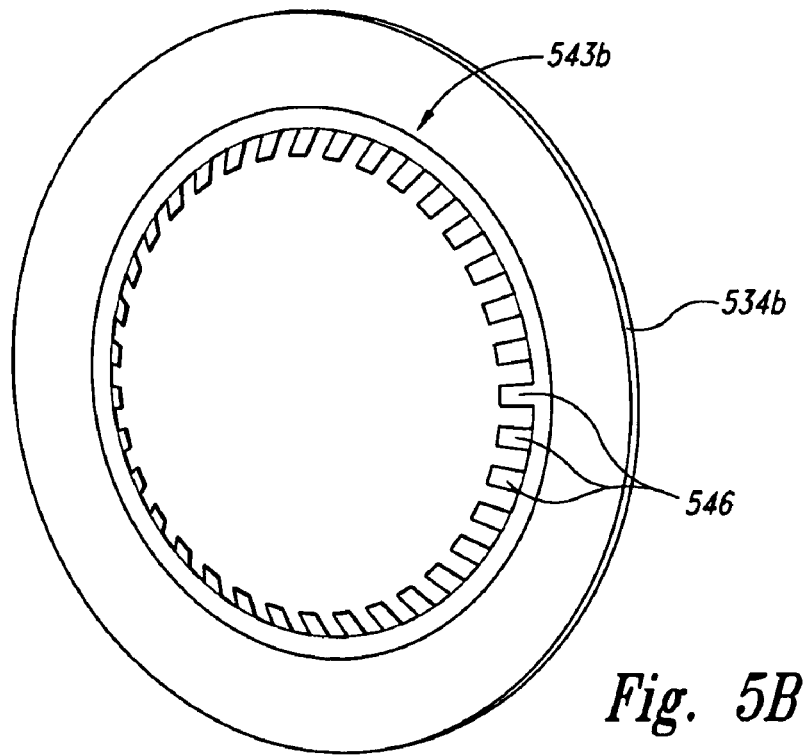

In other embodiments, the exhaust bulkhead 134 and/or any of the baffles 150 can have other configurations that also accommodate radial stresses. For example, FIGS. 5A and 5B illustrate two representative embodiments. Beginning with FIG. 5A, an exhaust bulkhead 534a configured in accordance with one embodiment can include a radially compressible portion 543a that has different material properties than those of the rest of the bulkhead 534a. For example, the radially compressible portion 543a can include a material that is softer than the rest of the bulkhead 534, though still capable of withstanding expected loads and thermal conditions. Accordingly, the compressible material can compress and expand in the radial direction R when the exhaust bulkhead 534a is subjected to thermal loads.

FIG. 5B illustrates an exhaust bulkhead 534b having a radially compressible portion 543b that includes multiple, circumferentially spaced apart fingers 546. The arrangement of the exhaust bulkhead 534b can accordingly be generally similar to that of the aft-most bulkhead 150c described above with reference to FIG. 2. The fingers 546 can contact the exhaust conduit 131 (FIG. 4) at a non-perpendicular angle, so that when the exhaust bulkhead 534b is subjected to thermally induced radial loads, the fingers 546 can change shape and/or orientation. For example, the fingers 546 can slide relative to the exhaust conduit 131 to accommodate thermally induced stresses. In other embodiments, the support structure (e.g., the exhaust bulkhead) and/or any of the baffles described above with reference to FIGS. 2-5B can have still further arrangements that accommodate thermally induced radial stresses.

From the foregoing, it will be appreciated that specific embodiments of the invention have been described herein for purposes of illustration, but that various modifications may be made without deviating from the invention. For example, the bulkheads and/or baffles can include materials and/or shapes or configurations different than those described above, while still including radially compressible portions or other structures that accommodate thermally induced radial loads, without buckling or inducing other non-plastic deformations. Certain aspects of the invention described in the context of particular embodiments may be combined or eliminated in other embodiments. For example, in some embodiments, the baffles include radially compressible portions, but the support structure does not. In other embodiments, the support structure includes a radially compressible portion, but the baffles do not, or the baffles are eliminated entirely. Further, while advantages of certain embodiments of the invention have been described in the context of those embodiments, other embodiments may also exhibit such advantages, and not all embodiments need necessarily exhibit such advantages to fall within the scope of the invention. Accordingly, the invention is not limited except as by the appended claims.

We claim:

1. An aircraft system, comprising;
    an auxiliary power unit exhaust that includes:
        an exhaust flow conduit;
        a housing disposed outwardly from the flow conduit;
        a support providing a loadpath between the flow conduit and the housing; and
        a baffle positioned along the flow conduit; wherein at least one of the support and the baffle has a resilient, radially compressible portion between the flow conduit and the housing, the compressible portion having cross-sectional profile shape that varies in a non-monotonic manner.

2. The system of claim 1 wherein the support includes a bulkhead, and wherein the bulkhead and the baffle are positioned in an annular region between the exhaust flow conduit and the housing, and wherein the bulkhead and the baffle each have a generally uniform material thickness, with generally uniform material properties, further wherein the bulkhead and the baffle each have a radially compressible portion with a generally wavy profile shape having a peak and a trough projecting in opposing directions generally parallel to a flow path of the exhaust conduit, and wherein the peak and trough form circumferentially-extending ridges around the exhaust flow conduit.

3. The system of claim 1 wherein both the baffle and the support have a cross-sectional profile shape that varies in a non-monotonic manner.

4. The system of claim 1 wherein the profile has a generally wavy shape with at least one peak and at least one trough positioned at different locations along an exhaust flow direction of the flow conduit.

5. The system of claim 1 wherein the baffle is one of a plurality of baffles positioned along the flow conduit, each having a cross-sectional profile shape that varies in a non-monotonic manner.

6. The system of claim 1 wherein the profile varies in a non-monotonic manner along an axis extending away from the flow conduit.

7. The system of claim 1 wherein the profile is formed by pre-buckling the at least one of the support and the baffle before mounting it between the flow conduit and the housing.

8. The system of claim 1, wherein the flow conduit has an entrance coupleable to an auxiliary power unit exhaust aperture, and an exit downstream of the entrance.

9. The system of claim 8 wherein the support is positioned toward the entrance and wherein the support has a cross-sectional profile that varies in a non-monotonic manner.

10. The system of claim 1 wherein the housing includes an aircraft tail cone carrying the flow conduit, the support and the baffle.

11. The system of claim 1 wherein the housing includes an aircraft tail cone carrying the flow conduit, the support and the baffle, and wherein the system further comprises:
an aircraft fuselage carrying the tail cone;
an auxiliary power unit carried by the tail cone and coupled to the flow conduit;
wings carried by the fuselage; and
a propulsion system carried by at least one of the fuselage and the wings.

12. The system of claim 1 wherein the at least one of the support and the baffle does not include a stiffener positioned to resist radial flexure.

13. The system of claim 1 wherein a thickness of a material forming the cross-sectional profile shape is generally uniform.

14. The system of claim 1 wherein the radially compressible portion is more compressible in a radial direction than is a radially neighboring portion of the at least one of the support and the baffle.

15. A method for forming an exhaust system for an aircraft auxiliary power unit, comprising:
providing a support and a baffle;
forming a resilient, radially compressible portion in at least one of the support and the baffle, including forming a cross-sectional profile of at least one of the support and the baffle to vary in a non-monotonic manner along a radial axis;
connecting the support and the baffle between an exhaust flow conduit for an auxiliary power unit and an outer housing; and
positioning the baffle between the exhaust flow conduit and the outer housing.

16. The method of claim 15 wherein forming a cross-sectional profile includes pre-buckling the at least one of the support and the baffle prior to locating it between the flow conduit and the outer housing.

17. The method of claim 15 wherein forming a cross-sectional profile includes forming a cross-sectional profile having a generally uniform material thickness, with generally uniform material properties, and with a generally wavy profile shape having peaks and troughs projecting in opposing directions generally parallel to a flow path of the exhaust conduit, with the peaks forming a circumferentially-extending ridge around the exhaust flow conduit.

18. The method of claim 15, further comprising connecting the exhaust flow conduit to an aircraft auxiliary power unit.

19. An aircraft system, comprising:
an auxiliary power unit exhaust that includes:
an exhaust flow conduit;
a housing disposed outwardly from the flow conduit;
a support providing a loadpath between the flow conduit and the housing; and
a baffle positioned along the flow conduit; wherein
at least one of the support and the baffle has a resilient, radially compressible portion between the flow conduit and the housing; and wherein
the support includes a bulkhead, the bulkhead and the baffle are positioned in an annular region between the exhaust flow conduit and the housing, and the bulkhead and the baffle each have a generally uniform material thickness, with generally uniform material properties, further wherein the bulkhead and the baffle each have a radially compressible portion with a generally wavy profile shape having a peak and a trough projecting in opposing directions generally parallel to a flow path of the exhaust conduit, and wherein the peak and trough form circumferentially-extending ridges around the exhaust flow conduit.

20. An aircraft system, comprising:
an auxiliary power unit exhaust that includes:
an exhaust flow conduit;
a housing disposed outwardly from the flow conduit;
a support providing a loadpath between the flow conduit and the housing; and
a baffle positioned along the flow conduit; wherein
at least one of the support and the baffle has a resilient, radially compressible portion between the flow conduit and the housing; and wherein
the compressible portion has a cross-sectional profile formed by pre-buckling the at least one of the support and the baffle before mounting it between the flow conduit and the housing.

21. An aircraft system, comprising:
an auxiliary power unit exhaust that includes:
an exhaust flow conduit;
a housing disposed outwardly from the flow conduit;
a support providing a loadpath between the flow conduit and the housing; and
a baffle positioned along the flow conduit; wherein at least one of the support and the baffle has a resilient, radially compressible portion between the flow conduit and the housing; and wherein the flow conduit has an entrance coupleable to an auxiliary power unit exhaust aperture, and an exit downstream of the entrance, and the support is positioned toward the entrance and has a cross-sectional profile that varies in a non-monotonic manner.

22. An aircraft system, comprising:
an auxiliary power unit exhaust that includes:
   an exhaust flow conduit;
   a housing disposed outwardly from the flow conduit;
   a support providing a loadpath between the flow conduit and the housing; and
   a baffle positioned along the flow conduit; wherein
   at least one of the support and the baffle has a resilient, radially compressible portion between the flow conduit and the housing, and wherein the resilient, radially compressible portion and a neighboring portion adjacent the flow conduit are formed from a generally continuous material.

23. An aircraft system, comprising:
an auxiliary power unit exhaust that includes:
   an exhaust flow conduit;
   a housing disposed outwardly from the flow conduit;
   a support providing a loadpath between the flow conduit and the housing; and
   a baffle positioned along the flow conduit; wherein
   at least one of the support and the baffle has a resilient, radially compressible portion between the flow conduit and the housing, and wherein at least part of the resilient, radially compressible portion is spaced apart from the flow conduit by a neighboring portion of the at least one of the support and the baffle.

* * * * *